(12) United States Patent
Dayan et al.

(10) Patent No.: US 6,912,663 B1
(45) Date of Patent: Jun. 28, 2005

(54) METHOD AND SYSTEM FOR SECURING A PERSONAL COMPUTER BUS

(75) Inventors: Richard Alan Dayan, Wake Forest, NC (US); Eric Richard Kern, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,104

(22) Filed: Dec. 6, 1999

(51) Int. Cl.$^7$ .............................................. G06F 13/00
(52) U.S. Cl. ................. 713/200; 713/100; 713/201; 713/202; 364/900; 361/683; 380/25; 395/882
(58) Field of Search ................. 713/200, 201, 713/202, 100; 364/900; 361/683; 380/25; 395/882

(56) References Cited

U.S. PATENT DOCUMENTS

| | | | | |
|---|---|---|---|---|
| 5,642,805 A | * | 7/1997 | Tefft ......................... | 200/43.08 |
| 5,724,027 A | * | 3/1998 | Shipman et al. ............ | 713/201 |
| 5,784,581 A | * | 7/1998 | Hannah ....................... | 710/110 |
| 5,835,791 A | * | 11/1998 | Goff et al. .................... | 710/62 |
| 5,836,010 A | * | 11/1998 | Kim ............................ | 713/200 |
| 5,952,632 A | * | 9/1999 | Irvine ....................... | 200/16 E |
| 6,098,171 A | * | 8/2000 | Johnson et al. ............. | 713/200 |
| 6,138,240 A | * | 10/2000 | Tran et al. ................... | 713/202 |
| 6,223,284 B1 | * | 4/2001 | Novoa et al. ............... | 713/100 |
| 6,480,097 B1 | * | 11/2002 | Zinsky et al. ................ | 340/5.8 |
| 6,546,441 B1 | * | 4/2003 | Lum ........................... | 710/72 |

* cited by examiner

*Primary Examiner*—Gregory Morse
*Assistant Examiner*—Carl G. Colin
(74) *Attorney, Agent, or Firm*—Carlos Munoz-Bustamante; Dillon & Yudell LLP (57) ABSTRACT

A system and method of securing a USB Interface of a personal computer against inputs from a user when the keyboard of the personal computer is secured against user inputs. By combining the hardware locking of the USB Interface is with the locking of the keyboard controllers, a potential circumvention of the keyboard controller lock is avoided and security of the data stored on a personal computer is increased.

9 Claims, 5 Drawing Sheets

Figure 4 USB Keyboard Sensing Unit

Figure 5

METHOD AND SYSTEM FOR SECURING A PERSONAL COMPUTER BUS

CROSS REFERENCE TO RELATED PATENTS

The present invention is related to U.S. Pat. No. 4,460,957 entitled "Self Pacing Serial Keyboard Interface for a Data Processing System" which is assigned to the assignee of the present invention. The teachings of this patent, which is sometimes referred to as the Keyboard Patent, are hereby specifically incorporated into this document by reference.

The present invention is also related to two patent applications related to the selective locking of a keyboard. The patent applications, which are sometimes referred to as the ROM Scan Applications, are Ser. No. 09/052,733 (issued on Aug. 1, 2000 as U.S. Pat. No. 6,098,171 B1), entailed "Personal Computer ROM Scan During Startup Protection" filed Mar. 31, 1998 by Robert Duane Johnson et al. and "Method and System for Improved Security During ROM Scan," Ser. No. 09/431,728 (issued on Nov. 26, 2002 as U.S. Pat. No. 6,487,465 B1) filed on Nov. 1, 1999, by Richard Alan Dayan et al. The ROM scan Applications are assigned to the assignee of the present invention, with the disclosures of these patents specifically incorporated herein by reference.

BACKGROUND OF THE INVENTION

1. Field of the Invention

The present invention is an improved system and method for providing security in a personal computer. More particularly, the present invention relates to securing an external bus (particularly the Universal Serial Bus, sometimes referred to as the USB Interface) and coupling the locked state of that bus with the locked state of the keyboard. This accomplishes security of the external bus consistent with the security of the keyboard.

2. Background Art

Personal computers in general, and the IBM personal computers in particular, have obtained wide spread use for a variety of data processing applications, providing computing power to many segments of society for handling information in the form of digital data. These personal computers may be defined as desktop, floor-standing or a portable unit and typically include a system unit with a single system processor with volatile and nonvolatile memory, a display, one or more input devices such as a keyboard or a mouse connected to dedicated data ports in the system unit and one or more storage devices such as a floppy disk drive, a fixed disk drive or a CD ROM drive, and optionally, a printer or other output device. The components of a personal computer are assembled into an enclosure which includes a variety of data ports or external connectors to couple input and output devices to the single system processor.

Such personal computers not only include the dedicated port(s) for connecting the keyboard or mouse, but a variety of general purpose buses have been established to interface a wide variety of peripheral devices through well-defined (in some cases, industry-standard or quasi-industry standard) interfaces. One such type of interface is the Universal Serial Bus interface (sometimes referred to as the USB interface), the parameters of which are set forth in a generally available document entitled "Universal Serial Bus Specification" Release 1.1 dated Sep. 23, 1998 from USB.ORG which was prepared by representatives of four companies; Compaq, Intel, Microsoft and NEC. Buses which comply with this standard are referred to as the USB interface and have been included on several recent versions of personal computers from various different manufactures for attaching devices for plug-and-play of personal computers with such computer peripherals as telephones, modems, CD-ROM drives, joysticks, tape and floppy drives, scanner and printers. Additionally, the USB Interface allows an alternate connection for input devices such as keyboards and mice, providing an alternate to the dedicated keyboard and mouse ports which many manufacturers provide.

The ROM Scan Patents disclose that it is sometimes desirable to prevent a user input at an input device such as a keyboard or a mouse, a feature which locks out the keyboard from making effective inputs during sensitive periods such as the initialization of the personal computer during its power-on-self test, POST, and ROM scan. The ROM Scan Patents also teach that the memory of the computer system may be vulnerable to user inputs during these times and that user inputs should be controlled. One such way to control the input is to lock out the keyboard for at least part of the time during which ROM scan is occurring, as taught by the ROM Scan Patents.

In addition, there are other security features which advantageously control the keyboard. When a user leaves his workstation, he can invoke a security feature which locks out the keyboard until a key is used to unlock the system. Some systems also provide security by locking the keyboard during certain time periods and other require the use of a supervisory key to unlock the keyboard for use. Locking of a keyboard may be selectively controlled (by either a physical key or by password or other security control) and is well known in the trade as a desirable feature of current models of personal computers.

However, no locks for the USB port of the personal computer are specified in the document referred to above—the Universal Serial Bus is generally available whenever the personal computer is powered up. Thus, a keyboard attached through the dedicated keyboard port may be secured against entries, but a similar keyboard accomplishing the same function is not secured at all when attached through the USB port.

SUMMARY OF THE INVENTION

The present invention overcomes the disadvantages and limitations of the prior art devices while providing security for the system against devices hooked into it through an external bus such as the USB interface.

The present invention has the advantage that a keyboard lock applied to the keyboard port in a computer system has the effect of locking out an input device attached to the USB Interface.

By synchronizing the locking and unlocking of a keyboard attached to the dedicated keyboard port of a computer system with a USB interface, the system is secure against input devices, whether the input the device is attached to the dedicated port or attached to a USB interface.

The present invention has the advantage that it is a simple, yet effective, way of providing security for the sensitive portions of computer storage during times when they are vulnerable to attack because the operating system is writing to those portions of memory, e.g., during the power-on-self-test. The present invention overcomes the disadvantage in the prior art that the computer could be locked against keyboard input through the keyboard port while remaining open to a keyboard entry through the USB interface where an input device such as a keyboard is one of the devices intended to be connected.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Having thus described some of the objects and advantages of the present invention, other objects and advantages of this invention will be apparent through the discussion of the drawings of present invention of an improved computer security system and method in which:

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures. Some of those skilled in the relevant art will also recognize that some of the benefits of the present invention can be obtained by using only some of the features described in connection with the present invention without the corresponding use of other features.

Figure 1:
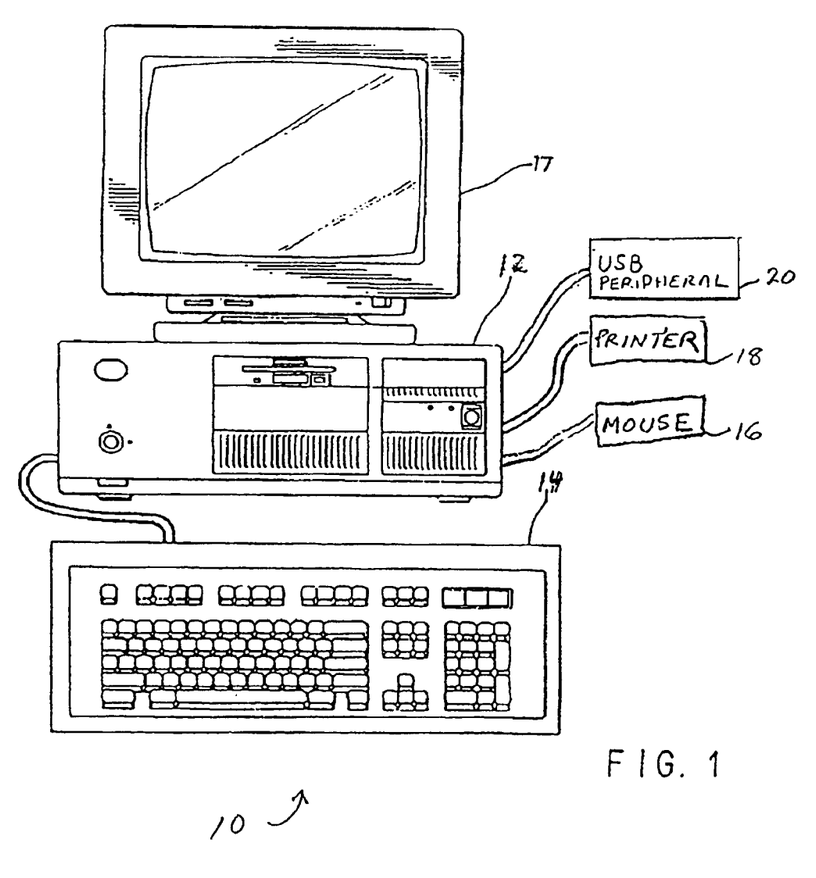
FIG. 1 is a pictorial view of a computer system environment useful for understanding the present invention.

FIG. 1 is a pictorial view of a computer system useful in understanding the present invention. The computer system includes a system unit 12 with two input devices, a keyboard 14 and a mouse 16, coupled to it. The couplings are not shown, but the system unit of many personal computers of recent vintage include dedicated ports for plugging in the keyboard and the mouse because such input devices are ubiquitous. Also shown as a part of the computer system is a display 17, an optional printer 18 and a USB peripheral device 20. Many system units of current model personal computers include interfaces (or plugs) brought out to the outside of the case for specific devices (such as the display 17) and also a variety of general purpose ports into which peripheral devices can be attached, including at least one Universal Serial Bus (USB) interfaces (many personal computers from IBM currently provide two USB ports for attaching peripherals operating using the USB standards references above). The USB peripheral device is plugged into one USB port of the system unit 12 which connects the USB peripheral to a system bus inside the system unit 12.

As described elsewhere in this document in greater detail, the USB interface was designed to accommodate an input or output device selected from a wide variety of potential input/output devices, such as a CD-ROM drive or a keyboard.

The ROM Scan Patents describe the risks associated with the use of a keyboard during initial start up of a personal computer, when the computer goes through power-on-self-test (POST) and performs a ROM scan looking for ROM adapters. The ROM Scan Patents describe the risks as potential data security risks and propose that the keyboard be locked out during that time (unless a user input is required by the ROM adapter). It is proposed in the ROM Scan Patents that the dedicated interface to the keyboard and the mouse be selectively locked out from accepting user inputs during the period of time that the ROM scan is occurring in the computer. The present invention extends the protection (e.g., during the ROM scan activity) against keyboard input from a user to protect the computer system against user input transmitted through a general purpose interface such as the USB port by an input device connected to the USB port. In this way, the computer system is secured against user input during crucial time periods from either an input device connected either through a dedicated port for such an input device or through a general purpose port such as the USB interface. The concepts of the present invention relating to coupling the locking of the keyboard to a locking out of the general purpose port apply as well to times during the operation of the computer system other than the computer start up (e.g., POST and ROM scan) activity when the computer system may be locked against keyboard entries, such as to protect an unattended computer system.

Figure 2:
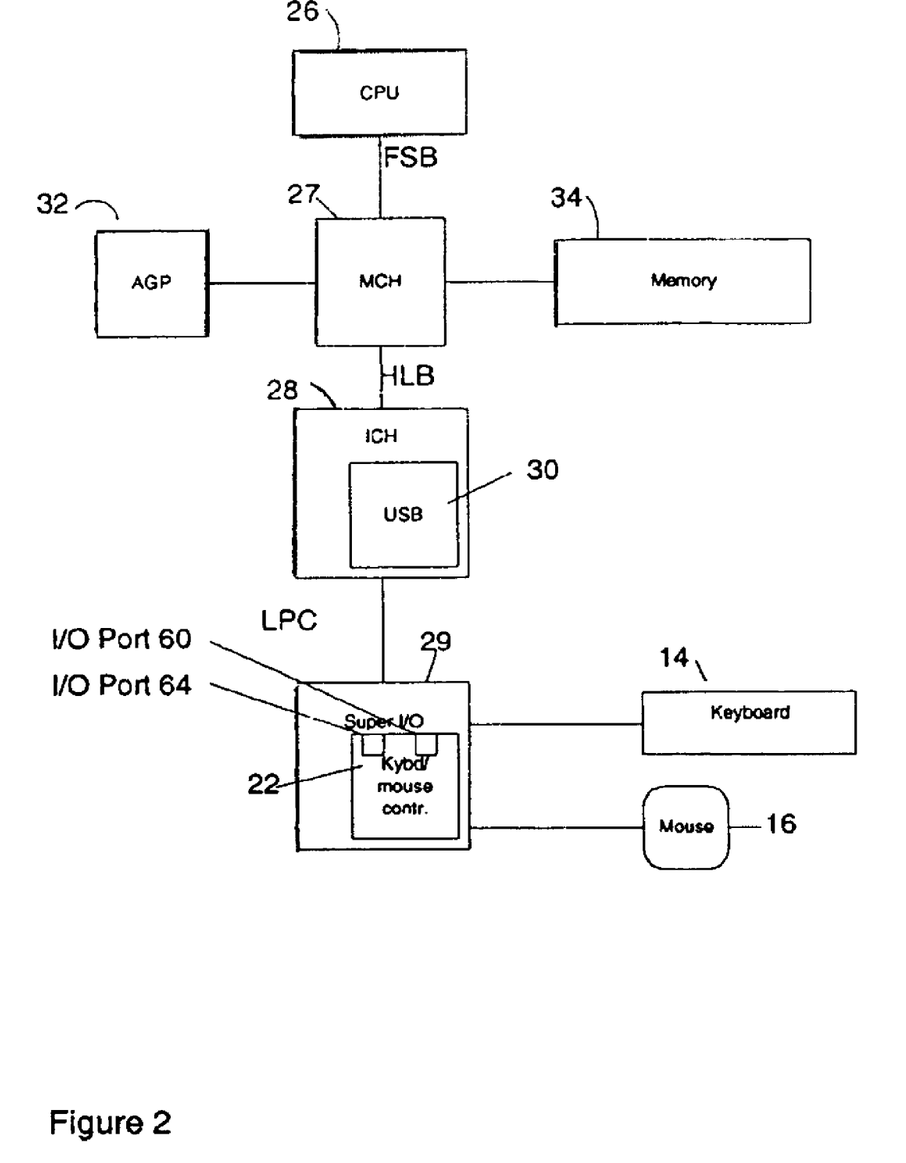
FIG. 2 is a block diagram of the computer system of FIG. 1.

FIG. 2 is a schematic diagram portion of the personal computer 10. The keyboard 14 is coupled through a keyboard/mouse controller 22 via a Low Pin Count (LPC) or ISA bus 24 (shown and labeled in FIG. 3) to the I/O Controller Hub (ICH) 28, and via a Hub Link Bus (HLB) to a Memory Controller Hub (MCH) 27, and via a Front Side Bus (FSB) to the central processor 26 of the personal computer 10. Also connected to MCH 27 are a system memory 34 and an Accelerated Graphics Port (AGP) 32. ICH 28 includes a USB host controller 30, about which more is described in reference to FIG. 3.

Access by the central processor 26 is via the processor's address space at I/O address space addresses $60_{hex}$ and $64_{hex}$. The mouse 16 is also coupled to the keyboard/mouse controller 22. Both the keyboard 14 and mouse 16 ports are referred to as the PS/2 Keyboard and PS/2 Mouse ports, respectively in the PC industry. As known in the state of the art, any device that emulates either a keyboard or mouse can attach to the respective port. In many personal computers, the keyboard 14 and mouse 16 ports are dedicated to their respective devices and are only configured to allow the attachment of such a device.

Figure 3:
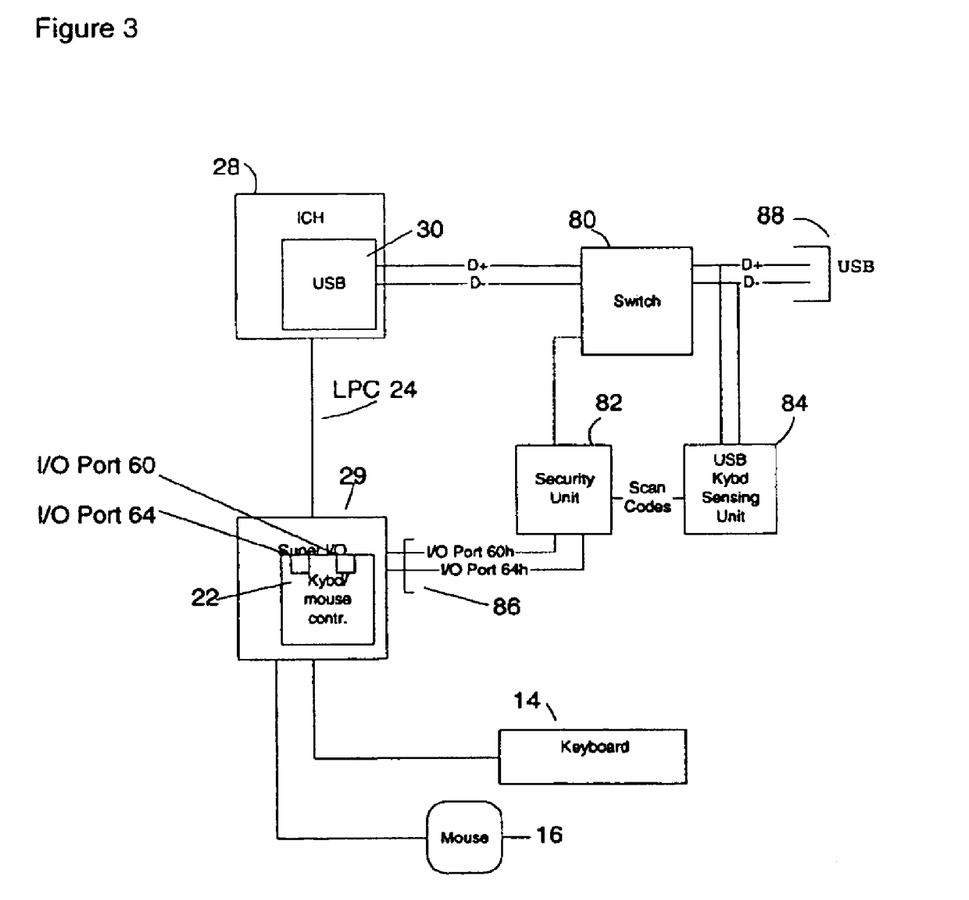
FIG. 3 is a block diagram of the Computer System with the Present invention included.

FIG. 3 is a schematic diagram illustrating the locking system of the present invention. The Keyboard/mouse controller 22, which is resident in the Super I/O module 29 and used to connect the keyboard 14 to the microprocessor 26, (shown in FIG. 2), is connected to a security unit $\mu$ which is a new connection for this invention. Alternative connections are possible to someone familiar with the state of the art.

For example, the security unit 82 could be connected to the LPC bus 24 to monitor the transmissions for commands targeting the keyboard 14 or its controller 22.

The USB host controller is connected to the USB ports 88 via an interposing switch 80. The switch 80 receives instructions from the security unit 82 to instruct the switch 80 to lock or unlock the bus via a control signal from security 82. When locked, the switch prevents data from reaching the USB host controller 30 and the microprocessor 26 (shown in FIG. 2). However, the USB Keyboard sensing unit 84 can still monitor the transmissions from devices attached t the USB ports 88 to monitor for entry of the password in order to unlock the bus As USB keyboard keystrokes are detected, the keyboard sensing unit unpacks the USB usage codes and converts them to the well known PS/2 keyboard scan codes to the security unit 82 for correct password entry verification. When unlocked, the switch 80 allows all USB transmissions from devices attached to the USB ports 88 to the USB host controller 30 and the microprocessor 26. In this way, when the switch 80 is in the locked state and keyboard inputs are not being processed from the USB ports 88 by the microprocessor 26, there is still something in the personal computer (the security unit 82) listening for a correct password to unlock the system and allow direct communication from either the keyboard 14 and/or a USB keyboard attached to one of the USB ports 88.

Figure 4:
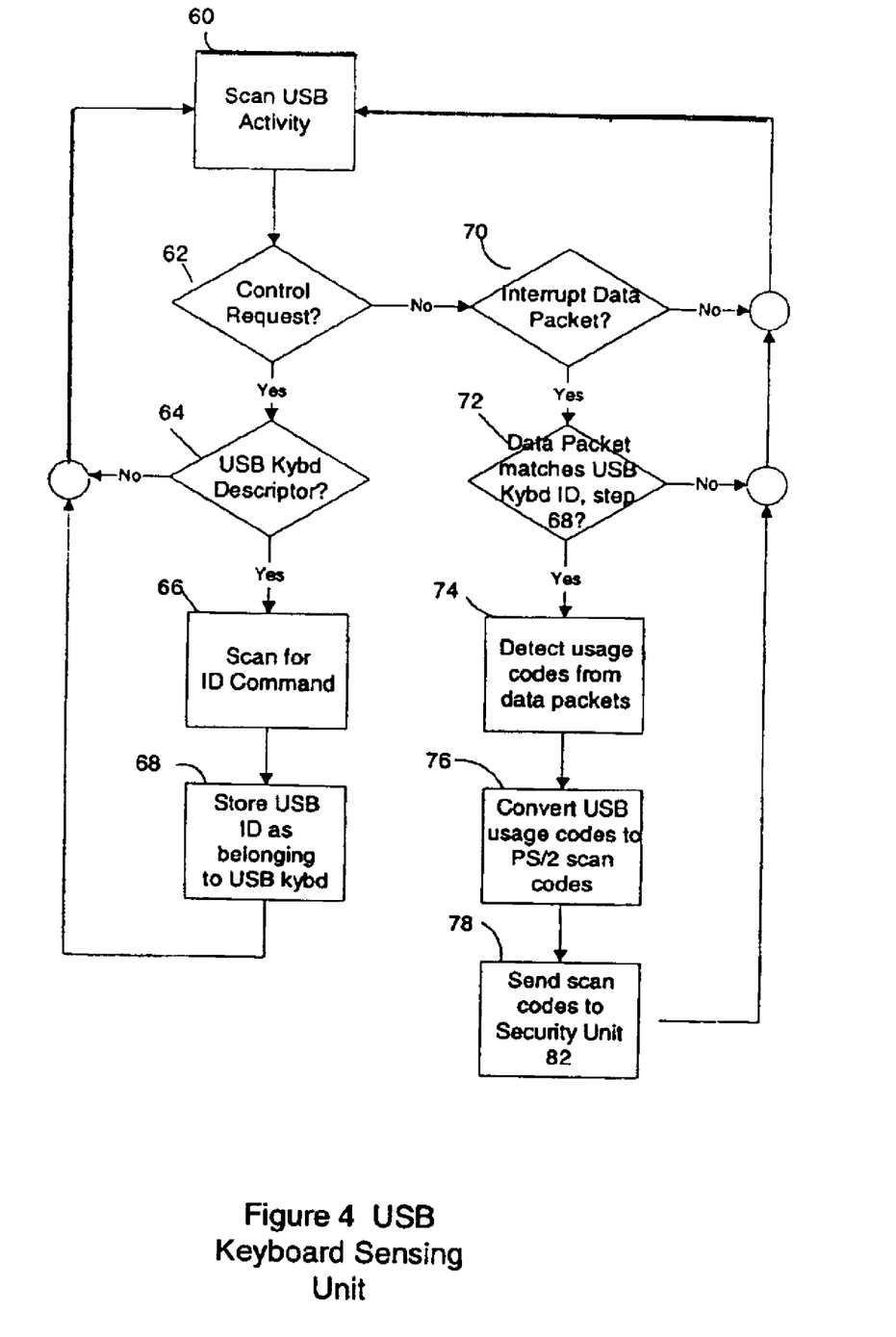
FIG. 4 is a logic diagram for a keyboard sensing unit as shown in FIG. 3.

FIG. 4 shows the logic in use in the USB Keyboard sensing unit 84 of this invention. The sensing unit 84 constantly monitors (step 60) the USB ports 88 for the presence of data and commands.

If data is found, it is checked to see if it is a Control Request (step 62). If not a control request, the data is checked to see if a USB device is sending data to the controller (step 70). If it is not a data packet, the sensing unit 84 returns to monitor the USB bus (step 60). If a USB data packet is present (step 70), the sensing unit 84 checks to see if it is from a keyboard device identified (step 72) in step 68. If not a keyboard data packet, the sensing unit 84 returns to monitor the USB bus (step 60). If it is a keyboard data packet (step 72), the sensing unit detects the usage code from the data packet (step 74) and converts the usage code to the industry standard scan code used by the PS/2 Keyboard device (step 76). The sensing unit 84 then transmits the scan code (step 78) to the Security Unit 82 for processing and returns to step 60 to monitor the USB ports 88 for more data packets.

Returning to step 62, if the data is a control request, the sensing unit tests to see if it is a USB Keyboard Descriptor (step 64). If not, the sensing unit returns to its monitoring state in step 60. If the data is a keyboard descriptor (step 64), the sensing unit looks for an ID command (step 66). When found, the USB ID is stored so that the USB device is recognized as a USB keyboard (step 68). Then processing returns to step 60 where the monitoring process resumes.

Figure 5:
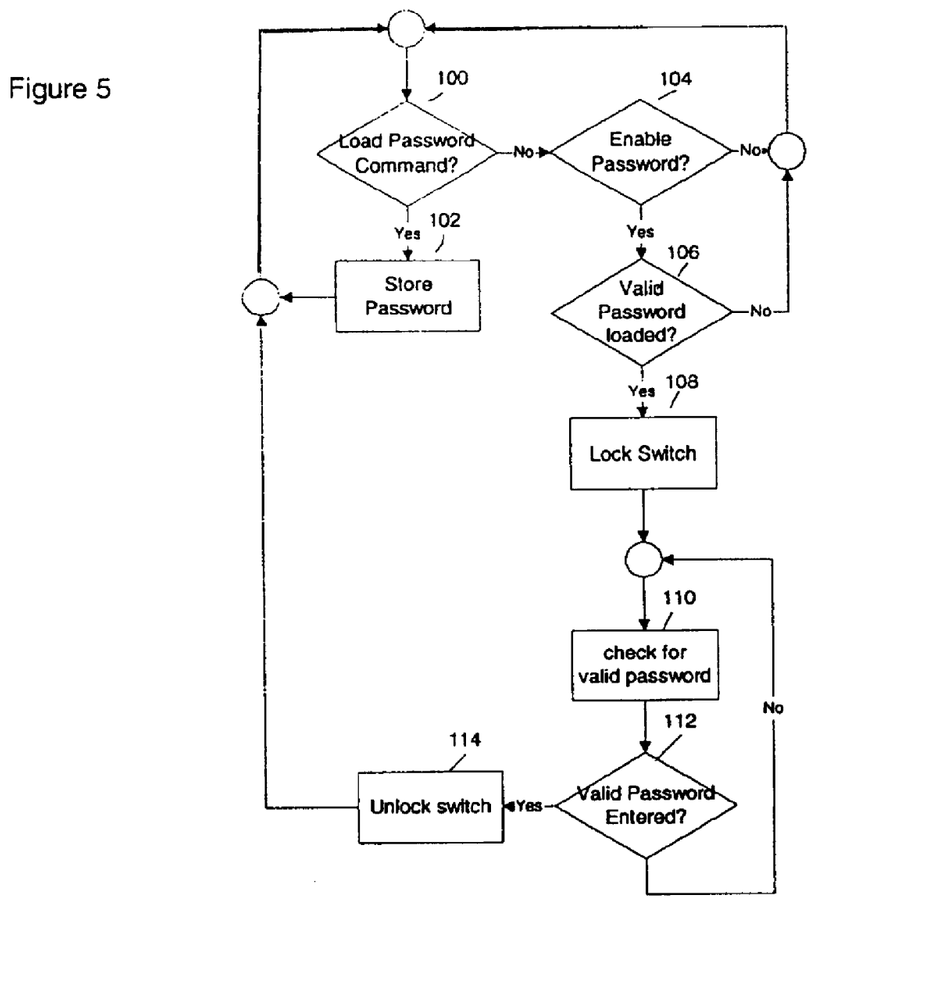
FIG. 5 is a logic diagram for a Security unit as shown in FIG. 3.

FIG. 5 illustrates a logic design for the security unit 82 to allow it to recognize a correct password to unlock the keyboard attached to the system when the personal computer (and its processor 26) is otherwise locked against user inputs. The security unit 82 receives, at block 100, a single unit of data, such as would emanate from a single key stroke on a PS/2 personal computer keyboard or a USB keyboard attached at USB interface 88, indicating either a single character or a command from the processor 26 to the keyboard and checked to see if this data is a Load Password Command from the processor. If it is a Load Password Command, the security unit 82 intercepts and stores the next set of characters as the password until a terminator (00$h$) is encountered (block 102). Processing continues at step 100 again.

Returning to step 100, if the data is not a Load Password Command, the security unit 82 checks to see if the data is an Enable Password Command (step 104) from the processor 26. If not, the security returns to step 100 to monitor the USB port 88 and PS/2 I/O ports 86 (60$h$ and 64$h$). If the data is an Enable Password command, the security unit 82 checks to see if a valid password is already loaded (step 106). If not, the security unit returns to step 100 to continue monitoring. If a valid password is already loaded, the security unit 82 locks the switch 80 in step 108. Following locking the keyboard, the security unit 82 goes into a monitoring state to check for the entry of a valid password (step 110). The password may be entered on either the PS/2 Keyboard 14 or a USB keyboard attached at the USB interface 88. The system remains locked with respect to keyboard entry until the password is correctly entered. In step 112, the security unit 82 checks to see if the password was entered. If not entered correctly, the security unit 82 goes to step 110 to monitor for entry of a password once again. If entered correctly, the switch 80 is unlocked (step 114) and the security unit 82 starts the process over again at step 100.

Of course, many modifications of the present invention will be apparent to those skilled in the relevant art in view of the foregoing description of the preferred embodiment, taken together with the accompanying drawings. The system for locking and unlocking the interface port to the keyboard port can be changed to fit the system requirements and designer's preferences, for example, by using a single interface through which the dedicated input device ports and the general purpose interfaces passes, then enabling or disabling the single interface, as desired, to prevent used input through either the dedicated port or the general purpose port. The system for locking the inputs is subject to various other approaches, including other software, hardware and combination approaches to accomplish the functions desired in a known manner. Thus, many modifications to the system described above can be made without departing from the spirit of the present invention. Accordingly, the foregoing description of the preferred embodiment should be considered as merely illustrative of the principles of the present invention and not in limitation thereof.

What is claimed is:

1. A computer comprising:
    a processor;
    a memory having a memory address space, the memory address space comprising a stored program, the stored program including a power-on-self-test (POST);
    a first input device operatively connected to the processor;
    an adapter read-only-memory (ROM) located in certain blocks of the memory address space;
    a control associated with the POST for preventing an input from the first input device during the POST to prevent user inputs from entering the memory;
    a security signature in the adapter ROM for identifying if the first input device may temporarily accept a user input;
    a ROM security routine for determining if user input is required and further including a test for user authorization;
    an indicator stored in the memory for permitting a user input during at least a portion of the POST, with the processor responding to the indicator and allowing a user input at the input device during POST by at least temporarily overriding the control preventing a user input during the POST if the user successfully satisfies the authorization test; and
    a second input device operatively connected to a Universal Serial Bus (USB) port in the computer, wherein the second input device is selectively locked out during the POST, and wherein the second input device being selectively locked out is dependent on the first input device being prevented from inputting a signal during the POST.

2. The computer of claim 1, wherein the first input device is a keyboard communicating with the computer via a dedicated keyboard port.

3. The computer of claim 2, wherein the keyboard is a PS/2 keyboard.

4. A method comprising:

disabling, via a first mechanism, a dedicated keyboard coupled to a dedicated keyboard port of a computer while a Power-On-Self-Test (POST) is executing in the computer; and in response to the dedicated keyboard being disabled, disabling via a second mechanism, a Universal Serial Bus (USB) port on the computer, wherein the USB port is selectively disabled during the POST, and wherein the selectively disabling of the USB port is dependent on the dedicated keyboard being prevented from inputting a signal during the POST.

5. The method of claim 4, further comprising monitoring the USB port for an enabling password, the enabling password permitting the dedicated keyboard to be re-enabled.

6. The method of claim 4, further comprising monitoring the USB port for an enabling password, the enabling password permitting the USB port to be re-enabled.

7. A computer comprising:

a first mechanism for disabling a dedicated keyboard coupled to a dedicated keyboard port of the computer; and a second mechanism for disabling a Universal Serial Bus (USB) compliant keyboard coupled to the computer via a USB port, wherein the USB compliant keyboard is selectively locked out during a Power On Self-Test (POST), and wherein the USB compliant keyboard is selectively locked out as dependent on the dedicated keyboard being disabled during the POST.

8. The computer of claim 7, further comprising a keyboard sensing switch for monitoring the USB port for an enabling password, the enabling password permitting the dedicated keyboard to be re-enabled.

9. The computer of claim 7, further comprising a keyboard sensing switch for monitoring the USB port for an enabling password, the enabling password permitting the USB port to be re-enabled.

* * * * *

UNITED STATES PATENT AND TRADEMARK OFFICE
CERTIFICATE OF CORRECTION

PATENT NO. : 6,912,663 B1
DATED : June 28, 2005
INVENTOR(S) : Dayan et al.

It is certified that error appears in the above-identified patent and that said Letters Patent is hereby corrected as shown below:

Column 1,
Line 11, delete "entailed" and insert -- entitled --.

Column 4,
Line 28, after "diagram" insert -- of a --.
Line 34, delete "of" and insert -- or --.
Line 54, delete the symbol after "unit" and insert -- 82 --.
Line 60, before "is" insert -- 30 --.
Line 63, after "security" and before "82" insert -- unit --.

Column 5,
Line 1, delete "t" and insert -- to --.
Line 3, after "bus" and before "As" insert -- 88. --.
Line 27, delete "from".

Signed and Sealed this

Eleventh Day of April, 2006

JON W. DUDAS
*Director of the United States Patent and Trademark Office*